No. 682,584. Patented Sept. 10, 1901.
M. R. D'ASAR.
MEANS FOR LOCATING SOURCE OF SOUND.
(Application filed Dec. 27, 1900.)
(No Model.) 2 Sheets—Sheet 1.
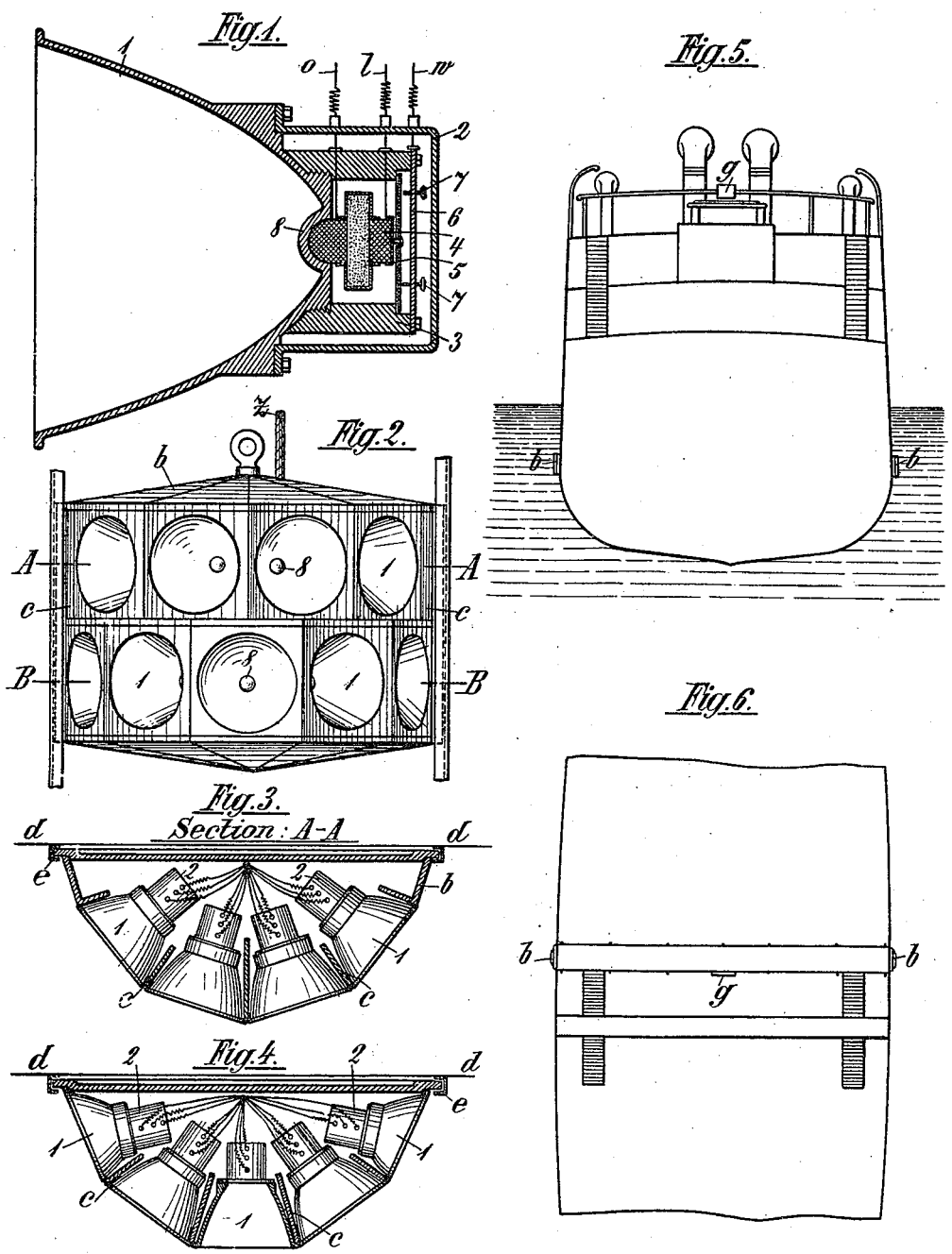

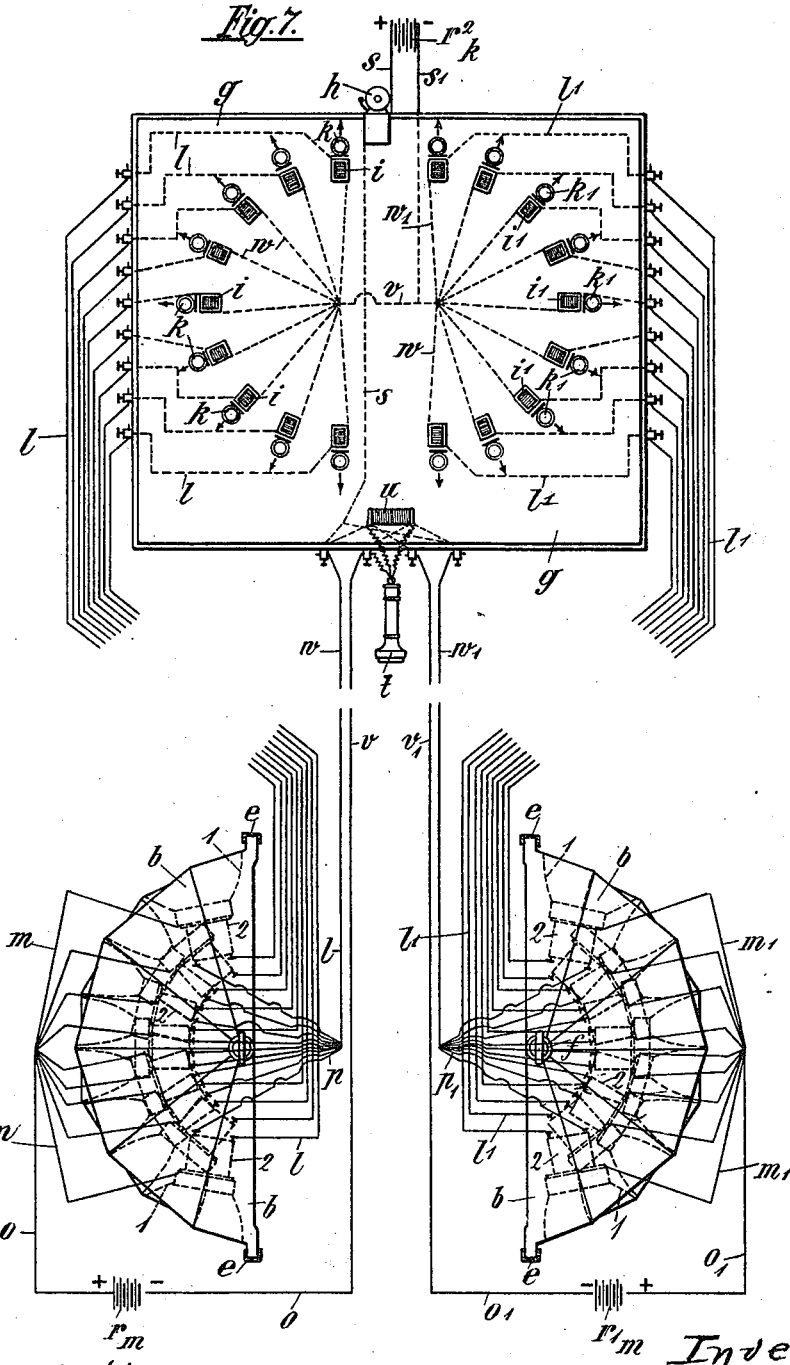

UNITED STATES PATENT OFFICE.

MARIO RUSSO D'ASAR, OF GENOA, ITALY.

MEANS FOR LOCATING SOURCE OF SOUND.

SPECIFICATION forming part of Letters Patent No. 682,584, dated September 10, 1901.

Application filed December 27, 1900. Serial No. 41,220. (No model.)

*To all whom it may concern:*

Be it known that I, MARIO RUSSO D'ASAR, a citizen of the Kingdom of Italy, residing at Genoa, Italy, have invented certain new and useful Improvements in Means for Locating a Source of Sound; and I do hereby declare the following to be a full, clear, and exact description of the invention, such as will enable others skilled in the art to which it appertains to make and use the same.

My invention relates to means for locating a source of sound.

In my Patent No. 660,802, of October 30, 1900, I have disclosed an apparatus for locating a source of sound as embodied in a form for nautical use. In that apparatus in order to determine the direction from the apparatus of a source of sound a certain manipulation of the apparatus in the nature of tests is required.

The object of the present invention is to provide an apparatus of the class described in which the direction of the source of sound from the apparatus will be automatically indicated, thereby avoiding the necessity of making tests for that purpose, while at the same time attention will be called to the apparatus immediately upon the arrival of a source of sound within the circle of receptivity of the apparatus. In addition to this the distance of a source of sound and its rate of travel, if moving, may be approximated by the use of a sound-reproducing device, such as a telephone-receiver, forming a part of this improved apparatus.

My invention will first be described in connection with the accompanying drawings and then particularly pointed out in the claims.

In the drawings, Figure 1 is a detail sectional view of a sound-collector provided with my new improvements; Fig. 2, an elevation of a sound-receiver formed from a plurality of sound-collectors arranged in a plurality of rows; Fig. 3, a sectional view of the same, taken on the line A A, Fig. 2; Fig. 4, a similar view taken on the line B B, Fig. 2; Fig. 5, an elevation of a vessel provided with my improved apparatus; Fig. 6, a broken plan view of such a vessel, showing the location of the apparatus; Fig. 7, a diagrammatic view illustrating the circuits of the apparatus.

As will be understood from my previous patent above referred to, apparatus of the kind set forth in that patent and in this application is particularly useful for nautical purposes. In the employment of such apparatus for nautical purposes it is expected that the principal sounds, which will operate the apparatus and which will be of importance to the navigator, will be those proceeding from the propeller of steamships, the dashing of water on reefs, &c.; but the apparatus would also announce the proximity of any sailing vessel which was producing a noise—as, for example, by sounding its fog-bell or the like. As this is almost universally the case in time of fogs, it is obvious that an apparatus of the class described becomes especially valuable during the times when it is most needed—viz., during such fogs.

Referring to the drawings, it will be seen that the sound funnel or collector (shown on an enlarged scale in Fig. 1) is distinguished from that previously protected by my patent previously referred to by the fact that in or behind the parabolic or spherically-formed funnel 1 and in the focus 8 of the same a microphone 4 is directly arranged and is united by conductors with a signal-board, an electric bell, and a telephone. The microphone is inclosed by an insulating-mantle 3, consisting, preferably, of hard rubber, which is screwed to the copper funnel-shell 1. It is not absolutely necessary to arrange the microphone exactly in the focus of the sound-funnel, since the entire funnel will be set in vibration by the entry of sound-waves. By the arrangement of the microphone in the focus of the sound-funnel, however, all vibrations, from whatever direction the same enter the funnel, are more surely indicated.

In the operation of the diaphragm or membrane 5 of the microphone the same contacts with the screws 7, adjustable in the metal plate 6, which is also connected by a conductor with the conductors of the signal-board, the alarm, and the telephone. The microphone is closed off tightly by a metal casing 2, fastened on behind the funnel-shell, and from out of this casing three wires insulated from the casing 2 extend to the signal-table or alarm and telephone.

A number of the sound-funnels 1, lying radially above and below each other in a closed box $b$, of copper plate, are so arranged that five funnels are provided in the lower division lying radially at equal angles in substantially a semicircle, while in the upper division four funnels are arranged lying vertically offset with relation to the lower funnels. In horizontal projection (see Fig. 5) these funnels form equal angles with each other—that is, the half-circle is divided by these nine funnels into a number of equal sectors. The casing or box $b$ is strengthened by vertical walls $c$, lying between the funnels, and has lateral copper guide-strips $d$, by means of which each funnel-box may be lowered to any desired depth in guideways $e$, also made of copper and located vertically upon the ship's sides. For this purpose the funnel-box has an eye $f$ above, by which it can be adjusted to any desired depth beneath the water by means of a rod, a cable, or the like. (Not shown.) A funnel-box $b$ is located at each flank of the ship, being submerged about two or three meters in the water, Figs. 6 and 7. At the bridge in the captain's cabin or at any other desired place is placed a signal-board $g$, as shown in Fig. 5, which board has electromagnets $i$ or $i'$, with signal-drops $k$ or $k'$ equal in number to the number of the funnels in both funnel-boxes and located at the same angle as that between the axes of the sound-funnels, which magnets each are connected through wires $l$ or $l'$ and $o$ or $o'$ to the corresponding microphones 4 of the sound-funnels 1. Besides this the plates 6 of the microphone 4 are connected by conductors to the signal-magnets $i\ i'$ and each by conductors $w$ or $w'$ and $s$ or $s'$ to the telephone $t$ and to the alarm $h$. The batteries $r$ or $r'$ serve to energize the circuits of the microphones of the copper boxes $b$, located on both sides of the ship, while for the alarm $h$ the battery $r^2$ is provided. So soon now as sound-waves produced through the movement of a distant ship or of water on a reef, &c., enter any one of the sound-funnels 1 this fact will be announced by means of the electrical alarm $h$ and at the same time the corresponding signal $k$ or $k'$ on the signal-board $g$ is actuated. The navigator will be informed by the alarm-signal of the approach of a neighboring ship or of the proximity of a reef or the like and can see at once upon the signal-board from what direction the ship comes or the direction in which the reef or the like lies. Furthermore, he can convince himself at once by means of the telephone at about what distance the ship, &c., is located and whether the same travels with greater or less speed; furthermore, whether it is a larger or smaller vessel. In the further movement of the ship under consideration he will always know at once by an examination of the signal-board what course the said ship is steering and how far distant the same still is from his own ship. The vibrations produced by the motor of its own ship will not be transmitted by the sound-funnels, because the funnels, microphones, &c., also make the same vibrations as the ship, and hence there is no relative movement of the microphone. The navigator has it in his power, therefore, by correct consideration of his signal-board, with the additional help of the telephone, to avoid in due time the dangers to be feared through a collision of his own vessel with another or with a reef or the like. Also the navigator can communicate signals to another vessel located in suitable proximity in such a way, for example, that strokes with a hammer are produced upon the one ship which can be well understood upon the other vessel. These signals can each be made up according to the number of strokes, so that a certain number of strokes correspond to a certain signal, and the other ship itself can give in the same way a signal readily heard and understood.

The apparatus is suitable also for ship-stations, lighthouses, &c., because the proximity of any moving vessels will be shown, and where there is danger—as, for example, from shallows, &c.—the said ship can be warned off by suitable signals from the light-tower, &c.

Having thus fully described my invention, what I claim as new, and desire to secure by Letters Patent of the United States, is—

1. In an apparatus for locating a source of sound, a sound-receiver comprising a plurality of sound-collectors located in rows one above the other, the sound-collectors in one row being intermediate those of the adjacent row.

2. In an apparatus for locating a source of sound-waves, the combination with a plurality of microphonic devices arranged at angles to one another, each device comprising a telephonic transmitter and a circuit-breaker, of a plurality of telephonic circuits controlled by the telephonic transmitter, a telephone-receiver common to all of said telephonic circuits, a plurality of signaling-circuits controlled by the circuit-breakers, indicating devices located in the respective signaling-circuits, and an alarm common to all of said signaling-circuits.

In testimony whereof I affix my signature in presence of two witnesses.

MARIO RUSSO D'ASAR.

Witnesses:
ANGELO BORAGINA,
JAMES FLETCHER.